United States Patent Office 3,584,318
Patented June 15, 1971

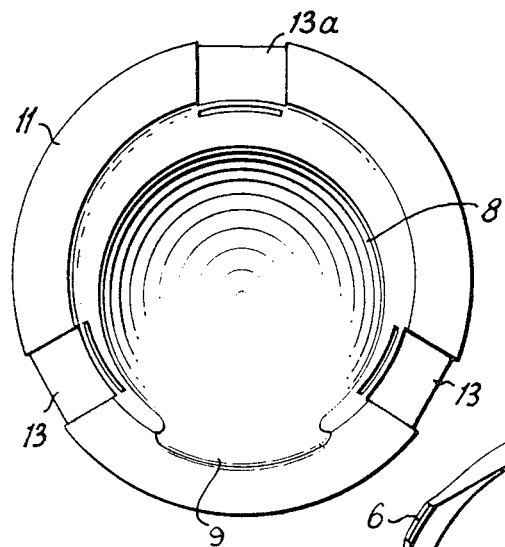
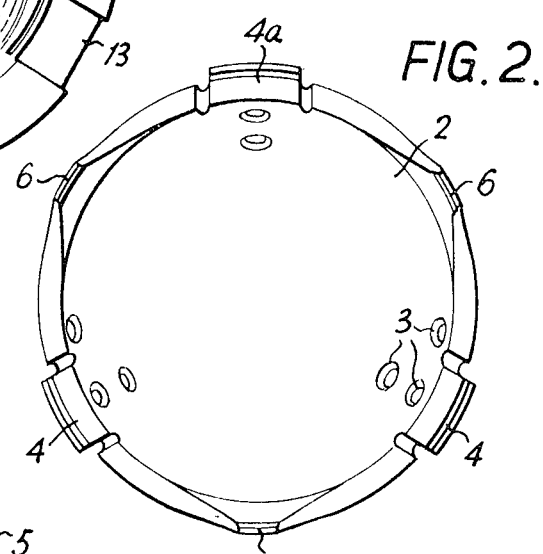
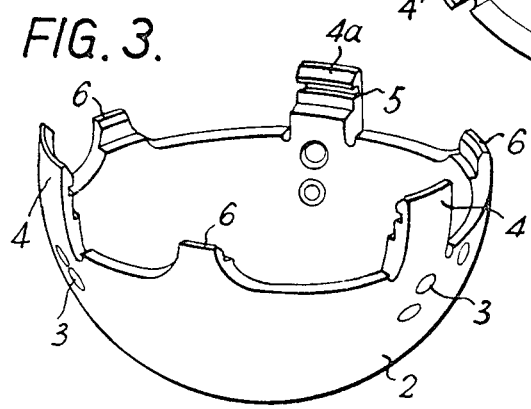
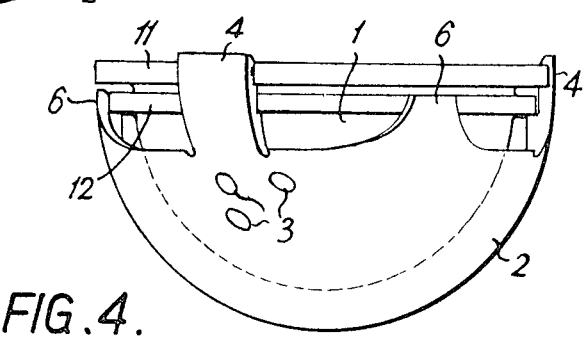

---

3,584,318
ARTIFICIAL JOINTS FOR USE IN SURGERY
John Tracey Scales, Stanmore, and Ian Duff-Barclay, Wargrave, England, assignors to National Research Development Corporation, London, England
Filed Jan. 13, 1966, Ser. No. 520,525
Claims priority, application Great Britain, Jan. 14, 1965, 1,739/65
Int. Cl. A61f *1/24, 5/01*
U.S. Cl. 3—1                                   6 Claims

ABSTRACT OF THE DISCLOSURE

A prosthesis used as an artificial joint in the human bone structure comprises a bearing member adapted to be held in a fixed position by a cup-shaped seating member which is anchored to the bone structure. The concave, spherical bearing surface of the bearing member has a relieved portion for receiving particles of attrition from the joint members formed during use of the joint and an opening for releasing the particles from the joint. A femoral member with a generally spherical shaped head having a flat area to insure better wearing of the joint is mounted within the bearing member.

---

This invention relates to artificial joints designed to replace hip joints and other joints in the human bone structure affected by disease or injury.

Many forms of artificial hip joint have been proposed in the past, comprising a spherical ball, representing the femoral head, fitting into a cup representing the acetabulum and providing a substantially hemispherical bearing surface for movement of the ball during the action of the joint. Attempts have been made to utilise various materials for artificial hip joints. For example, glass and plastics have been proposed but have been eventually abandoned either because they break or because they produce excessive foreign body tissue reaction. Metals are suitable for the material of the joint but even with the best metals available for the purpose, namely cobalt-chromium alloys, the metal-to-metal contact in these devices tends to cause wear of one or other of the parts. As a result, particles of attrition tend to accumulate and can in some cases give rise to seizure of the joint.

It is an object of the present invention to provide a hip joint which allows particles of attrition to escape from the bearing surface.

The invention comprises a generally cup-like bearing member for use in an artificial joint in the human bone structure having a part which provides the bearing surface and a part which is relieved from the bearing surface to provide a well for receiving particles of attrition formed from the material of the joint when in use. The well preferably has an opening for releasing the particles from the joint. As applied to hip joints, the cup-like member corresponds to the acetabulum and will for convenience be hereinafter referred to as the acetabulum cup.

Preferably the bearing surface is generally horseshoe-shaped and extends part way around the peripheral area of the cup. When the cup is fitted into the bone structure, it is mounted so that the bearing surface extends around the roof of the acetabulum. In use there is an area of least movement between the acetabulum cup and the ball of the femur located at the centre of the acetabulum cup. It is there that the particles of attrition tend to collect in conventional artificial hip joints and therefore in a joint according to the present invention the area of least movement should preferably lie within the relieved part of the cup.

The acetabulum cup must of course be held in a fixed position when installed in the patient. It need not be directly connected to the patient's bone structure and in accordance with this invention it is preferably adapted to be connected to and to nest within a cup-shaped seating member designed for anchorage to the bone structure.

Figure 5:
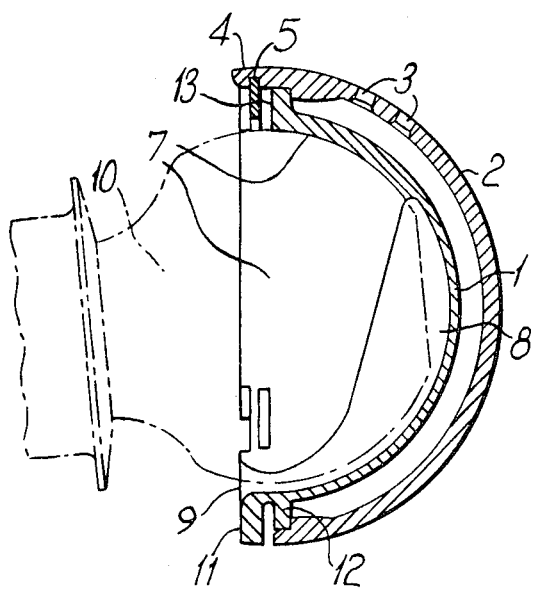
Figure 6:
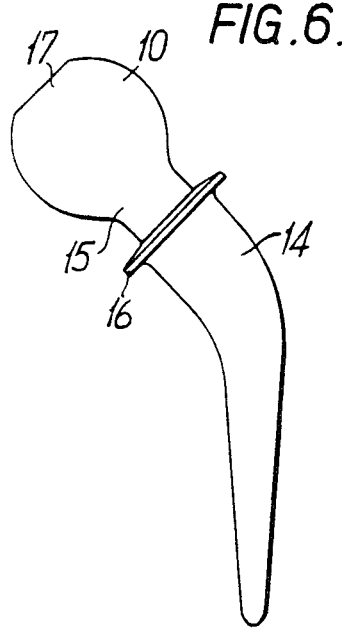
Figure 7:
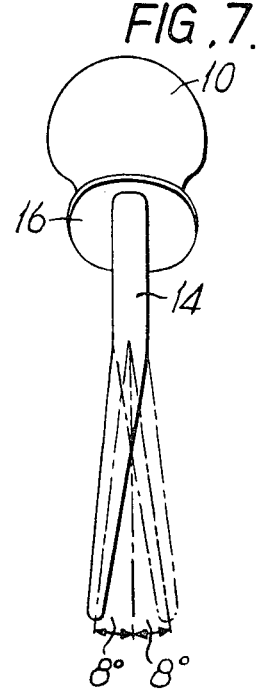

A specific embodiment of the invention will now be described with reference to the accompanying drawings of which:

FIG. 1 is a top view of the acetabulum cup;
FIG. 2 is a top view of the seating cup;
FIG. 3 is a perspective view of the seating cup;
FIG. 4 is a side view of the assembled cups;
FIG. 5 is a section of the assembled cups with the position of the femoral head indicated by dotted lines;
FIG. 6 is a side view of the femoral head;
FIG. 7 is a rear view of the femoral head.

The device comprises an inner cup 1 which is the acetabulum cup and an outer cup 2 which is the seating cup, both cups having spherical curvature. Both cups are made of a cobalt-chromium alloy.

The seating cup 2 is shaped to fit into the acetabulum of the pelvis to which it is attached by means of screws or nails (not shown) passing through the fixing holes 3 located near the edge of the cup. Normally three divergent screws or nails disposed approximately symmetrically around the edge of the cup are used. Since the optimum position for each screw or nail may vary from one patient to another a number of alternative holes are provided for each screw or nail and the fixing-holes 3 are arranged in three groups of two or three holes.

The seating cup 2 has three clips 4, each having a groove 5, projecting from its rim at equal intervals around its circumference. One of the clips (4a) is wider than the other two. Between the clips 4 there are three lugs 6 projected from the rim, the lugs 6 being less high than the clips 4. The clips 4 are slightly flexible and the lugs 6 are comparatively rigid.

The acetabulum cup 1 is formed with a part spherical bearing surface 7 which extends part way around the peripheral area of the cup in the form of a horseshoe. The inner adjoining area 8 of the cup is also part spherical but is relieved so as to leave a gap at 9 when the ball 10 of the femoral head is mounted in the cup 1.

The acetabulum cup 1 has two rims 11 and 12 on its outer surface. The rim 11 is of greater thickness than the groove 5, but there are three depressions 13 cut in the upper surfaces of the rim 11 where the thickness of the rim is reduced to that which will enter the grooves 5. The depressions 13 are spaced around the circumference of the rim 11 to correspond with the spacing of the clips 4 on the sealing cup 2 and their width corresponds with the width of the clips 4; one depression (13a) is wider than the other two. The depression 13a is located beside the centre of the bearing surface 7.

When the two cups are to be clipped together the acetabulum cup 1 is pressed down into the seating cup 2 with the depressions 13 located against the clips 4. The rim 11 forces the clips 4 apart until the rim 11, at the depression 13, is held in the grooves 5. The lugs 6 rest against the rim 12 thus preventing relative sideways movement between the two cups which might otherwise occur due to the flexibility of the clips 4. When the device is mounted in the bone structure, the seating cup 2 is positioned in the acetabulum of the pelvis with the widest clip 4a at the roof of the acetabulum, thus ensuring that the bearing surface 7 is correctly positioned.

The femoral head comprises a ball 10 connected to a shank 14 by a neck 15. A rim 16 between the neck 15 of the shank 14 prevents the shank 14 from being driven too far into the femur.

The ball 10 is of part spherical shape having a flat area 17 at the side distant from the neck 15. If this area 17 were not flattened, the part spherical area corresponding to it would not in use come into contact with the bearing area 7 of the cup 1 during walking and similar movements, and thus would wear less than the rest of the ball 10 and might in time form a ridge, which would however come into contact with the bearing area 7 occasionally when the patient crossed his legs and might score it.

The shank 14 has the convenitonal bent form but in addition is provided with a sideways kink of approximately 8° in one direction for the right leg and the other for the left leg as shown in FIG. 7. This sideways kink makes it easier to insert the shank 14 into the femur.

We claim:
1. A prosthesis for use as an artificial joint in the human bone structure comprising:
   a cup-shaped socket adapted to be connected to a bone, said socket having a concave bearing surface with a spherical curvature, said socket having an inner depression adjacent said bearing surface for receiving particles of attrition formed from the material of the joint during use and said socket having a groove extending between said inner depression and an edge of said socket for releasing particles of attrition from said inner depression, and an articulatory member having a head received within said socket, said head having a convex bearing surface with a spherical curvature of the same radius as the spherical curvature of said concave bearing surface of said socket thereby precluding contact between said head and said inner depression.

2. In the prosthesis of claim 1:
   said inner depression being centrally located with respect to the cup-shaped socket, and said groove intersecting a lower portion of said concave bearing surface of said socket.

3. In the prosthesis of claim 1:
   said head of said articulatory member having a flattened area at its apex to prevent the formation of a ridge on said head.

4. A bearing member suitable as a bearing component of a prosthesis for use as an artificial joint in the human bone structure, said bearing member being adapted to be connected to a bone, said bearing member having a bearing surface surrounded with an outer edge portion and a relieved portion adjacent and underlying said bearing surface forming a well for receiving particles of attrition formed from the material of the joint during use, at least a portion of said relieved portion intersecting said outer edge portion whereby particles of attrition can escape from said bearing surface and be released from said joint.

5. A prosthesis suitable for use as an artificial joint in the human bone structure which comprises:
   a bearing member adapted to be connected to a bone, said bearing member having a bearing surface, and said bearing surface having a relieved portion forming a well adjacent said bearing surface for receiving particles of attrition formed from the material of the joint during use, said well having an opening for releasing particles of attrition from the joint.

6. A prosthesis suitable for use as an artificial joint in the human bone structure which comprises:
   a bearing member adapted to be connected to a bone, said bearing member having a bearing surface which has a concave spherical curvature, and said bearing surface having a relieved portion forming a well adjacent said bearing surface for receiving particles of attrition formed from the material of the joint during use, and
   an articulatory member connected with the bearing member, said articulatory member having a head bearing against the bearing surface of said bearing member, said head having a convex spherical curvature of the same radius as the concave spherical curvature of said bearing surface, and said head having a flat area at its apex.

References Cited

UNITED STATES PATENTS

| | | | |
|---|---|---|---|
| 2,192,375 | 3/1940 | Goodale | 287—12X |
| 2,309,307 | 1/1943 | Geiger | 287—21 |
| 2,765,787 | 10/1956 | Pellet | 128—92C1 |
| 2,910,978 | 11/1959 | Urist | 128—92C |
| 2,947,308 | 8/1960 | Gorman | 128—92C1 |
| 3,102,536 | 9/1963 | Rose et al. | 128—92C1 |

FOREIGN PATENTS

| | | | |
|---|---|---|---|
| 1,122,634 | 5/1956 | France | 128—92C |
| 976,768 | 4/1964 | Germany | 128—92C1 |

OTHER REFERENCES

"A Metallic Femoral Head Prosthesis for the Hip Joint," by Earl D. McBride, M.D., reprint from the Journal of the International College of Surgeons, vol. XV, No. 4, April 1951, pp. 499–500 relied upon.

RICHARD A. GAUDET, Primary Examiner

R. L. FRINKS, Assistant Examiner

U.S. Cl. X.R.

128—92C; 287—12, 87